(12) United States Patent
Coleman

(10) Patent No.: US 10,837,559 B2
(45) Date of Patent: Nov. 17, 2020

(54) DYNAMIC SEAL

(71) Applicant: Aerojet Rocketdyne, Inc., Sacramento, CA (US)

(72) Inventor: Arthur Coleman, Canoga Park, CA (US)

(73) Assignee: AEROJET ROCKETDYNE, INC., Canoga Park, CA (US)

(*) Notice: Subject to any disclaimer, the term of this patent is extended or adjusted under 35 U.S.C. 154(b) by 111 days.

(21) Appl. No.: 16/302,173

(22) PCT Filed: May 8, 2017

(86) PCT No.: PCT/US2017/031523
§ 371 (c)(1),
(2) Date: Nov. 16, 2018

(87) PCT Pub. No.: WO2018/004828
PCT Pub. Date: Jan. 4, 2018

(65) Prior Publication Data
US 2019/0145525 A1    May 16, 2019

Related U.S. Application Data

(60) Provisional application No. 62/356,194, filed on Jun. 29, 2016.

(51) Int. Cl.
| | | |
|---|---|---|
| F16J 15/52 | (2006.01) |
| F02K 9/80 | (2006.01) |
| F16J 15/16 | (2006.01) |
| F16L 27/11 | (2006.01) |

(52) U.S. Cl.
CPC ............... *F16J 15/52* (2013.01); *F02K 9/80* (2013.01); *F16J 15/16* (2013.01); *F16L 27/11* (2013.01); *F05D 2300/43* (2013.01)

(58) Field of Classification Search
CPC .... F16J 15/50; F16J 15/52; F02K 9/80; F02K 9/26; F02K 9/56; F02K 9/94; F16L 27/11; F16L 27/107–108; F16L 27/113; F16L 27/00; F05D 2300/42; F05D 2300/43
USPC ........................................................ 277/389
See application file for complete search history.

(56) References Cited

U.S. PATENT DOCUMENTS

| | | | | |
|---|---|---|---|---|
| 1,947,072 A | * | 2/1934 | Walton ................. | F16L 27/12 |
| | | | | 277/619 |
| 3,124,502 A | * | 3/1964 | Radke ................... | F16J 15/20 |
| | | | | 428/66.4 |
| 3,680,874 A | * | 8/1972 | Schwarz ............... | F16L 27/127 |
| | | | | 277/618 |

(Continued)

FOREIGN PATENT DOCUMENTS

| | | |
|---|---|---|
| EP | 1291501 | 3/2003 |
| EP | 2546561 | 1/2013 |

OTHER PUBLICATIONS

International Preliminary Report on Patentability for PCT/US2017/031523 issued Jan. 1, 2019.

(Continued)

*Primary Examiner* — Nathan Cumar

(57) ABSTRACT

A duct includes first and second bellows sections. First and second torsional rings are attached to, respectively, the first and second bellows sections. First and second dynamic seals are sandwiched between the first and second torsional rings.

19 Claims, 4 Drawing Sheets

(56) References Cited

U.S. PATENT DOCUMENTS

| | | | | |
|---|---|---|---|---|
| 6,039,325 A * | 3/2000 | Steinetz | ............... | F16J 15/0812 277/528 |
| 6,449,942 B1 * | 9/2002 | Dean | ................... | F16L 27/0816 285/145.1 |
| 8,696,033 B2 * | 4/2014 | Cipra | ........................ | F02K 9/84 285/145.5 |
| 2002/0170285 A1 * | 11/2002 | Dean | ................... | F16L 27/0816 60/204 |
| 2003/0178786 A1 * | 9/2003 | Siegrist | .................. | F16J 15/164 277/549 |

OTHER PUBLICATIONS

International Search Report for International Patent Application No. PCT/US2017/031523 completed Aug. 8, 2017.

\* cited by examiner

US 10,837,559 B2

DYNAMIC SEAL

CROSS-REFERENCE TO RELATED APPLICATION

The present disclosure claims priority to U.S. Provisional Patent Application No. 62/356,194, filed Jun. 29, 2016.

BACKGROUND

Some types of rocket engines are designed to be steerable to provide flight trajectory control. For example, the rocket engine may be interconnected with actuators that are operable to gimbal the rocket engine. Propellant feed lines to the rocket engine may include flexible joints to permit the feed lines to gimbal with the engine. The flexible joints may include bellows that can stretch, compress, or angularly displace to provide the required movement.

SUMMARY

A duct according to an example of the present disclosure includes first and second bellows sections, first and second torsional rings attached to, respectively, the first and second bellows sections, and first and second dynamic seals sandwiched between the first and second torsional rings.

In a further embodiment of any of the foregoing embodiments, the first and second torsional rings define a seal cavity there between, and the first and second dynamic seals are disposed in the seal cavity.

In a further embodiment of any of the foregoing embodiments, the first and second dynamic seals include, respectively, first and second coils.

In a further embodiment of any of the foregoing embodiments, each of the first and second dynamic seals include an internal spring and an outer polymer jacket.

In a further embodiment of any of the foregoing embodiments, the outer polymer jacket is formed of fluoropolymer.

In a further embodiment of any of the foregoing embodiments, the outer polymer jacket partially surrounds the internal spring.

In a further embodiment of any of the foregoing embodiments, the inner seal member is a coil.

In a further embodiment of any of the foregoing embodiments, the outer polymer jacket includes a base and first and second spaced-apart arms extending from the base and between which the internal spring is disposed.

In a further embodiment of any of the foregoing embodiments, the first and second spaced-apart arms are non-symmetrical.

A further embodiment of any of the foregoing embodiments include surfaces of the first and second spaced-apart arms have a surface roughness that is equal to or less than 32 Ra.

The duct as recited in claim 1, further comprising a spacer ring disposed between the first and second dynamic seals.

In a further embodiment of any of the foregoing embodiments, the spacer ring is a split ring.

In a further embodiment of any of the foregoing embodiments, the spacer ring is formed of fluoropolymer.

In a further embodiment of any of the foregoing embodiments, the first and second dynamic seals are continuous rings.

In a further embodiment of any of the foregoing embodiments, at least one of the first or second torsional rings includes a port that opens to a region between the first and second dynamic seals.

A seal system according to an example of the present disclosure includes first and second rings that are subject to relative twisting movement there between. The first and second rings define an axial interface with each other. The axial interface provides at least a portion of a potential leak path between the first and second rings, and first and second dynamic seals disposed in the axial interface between the first and second rings.

In a further embodiment of any of the foregoing embodiments, the first and second dynamic seals are axially spaced apart.

A further embodiment of any of the foregoing embodiments includes a spacer ring disposed axially between the first and second dynamic seals.

In a further embodiment of any of the foregoing embodiments, each of the first and second dynamic seals includes a coil and an outer polymer jacket around the coil.

In a further embodiment of any of the foregoing embodiments, the outer polymer jacket includes a base and first and second spaced-apart arms extending from the base and between which the coil is disposed.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
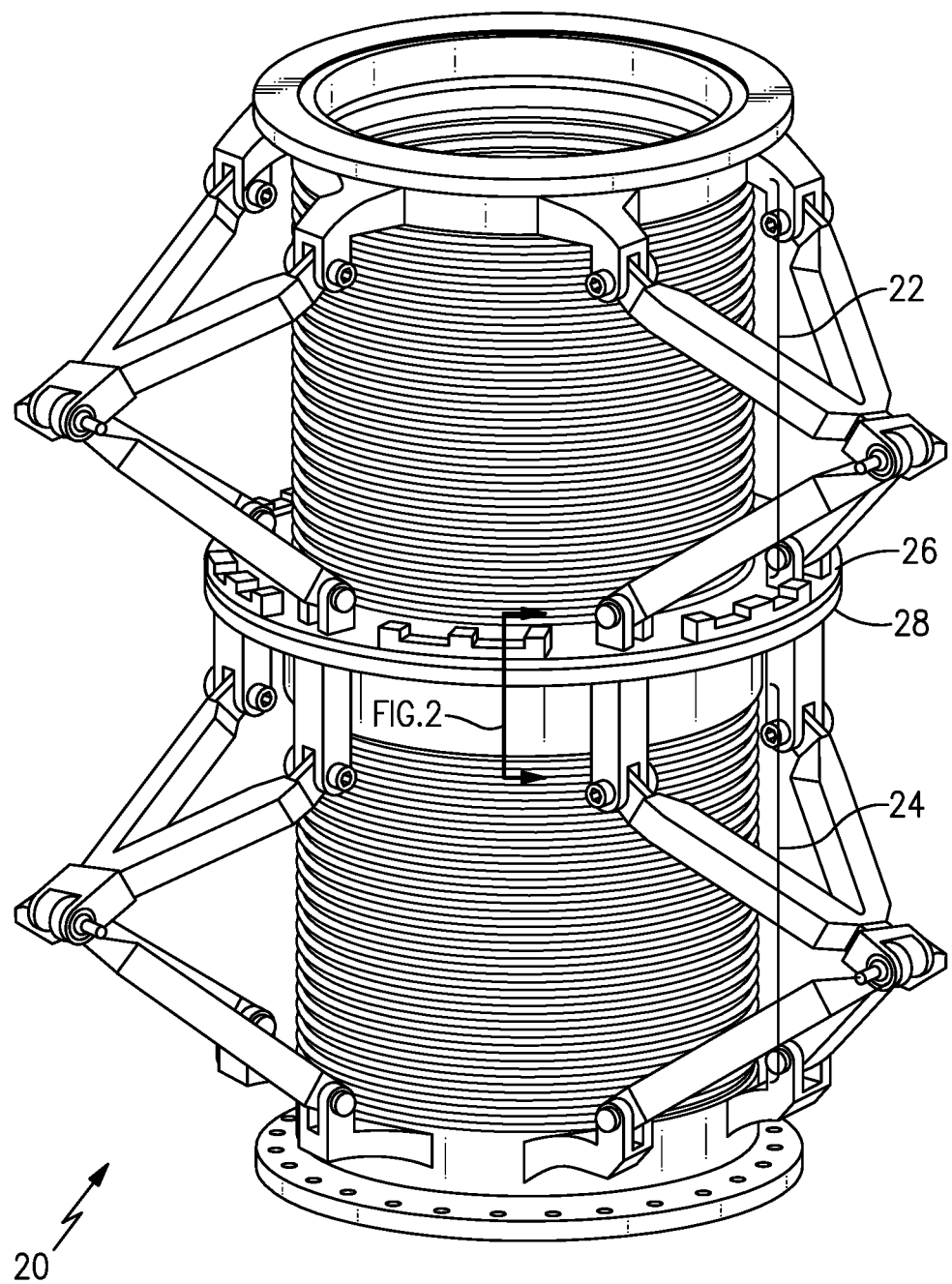
FIG. 1 illustrates an example duct that has a dynamic seal system.

FIG. 1 schematically illustrates an example duct 20. As shown, the duct 20 is configured to serve as an inlet duct in a liquid propulsion rocket engine. However, it is to be understood that the examples herein are also applicable to other types of ducts or seal systems, including but not limited to, industrial fluid applications or heating, ventilating, and air conditioning applications.

In this example, the duct 20 includes a first bellows section 22 and a second bellows section 24. For example, the bellows sections 22/24 are formed of corrugated metal or other material that is capable of bending, compressing, and extending because of the convolutions of the corrugations. In this example, the bellows sections 22/24 are generally cylindrical.

The duct 20 further includes a first torsional ring 26 and a second torsional ring 28. The first torsional ring 26 is attached to the first bellows section 22. The second torsional ring 28 is attached to the second bellows section 24. The first and second torsional rings 26/28 are secured together (e.g., using fasteners) and are part of a seal system 29, shown in a sectioned view in FIG. 2.

When a liquid propellant rocket engine is gimbaling, there may be twisting movement between the first and second bellows sections 22/24 and thus also twisting movement between the first and second torsional rings 26/28. The twisting movement between the first and second torsional rings 26/28 is not severe but may be enough to permit or contribute to leakage between the torsional rings 26/28. In this regard, the depicted seal system 29 allows for twisting or torsional movement between the first and second torsional rings 26/28 while maintaining dynamic sealing between these components.

Figure 2:
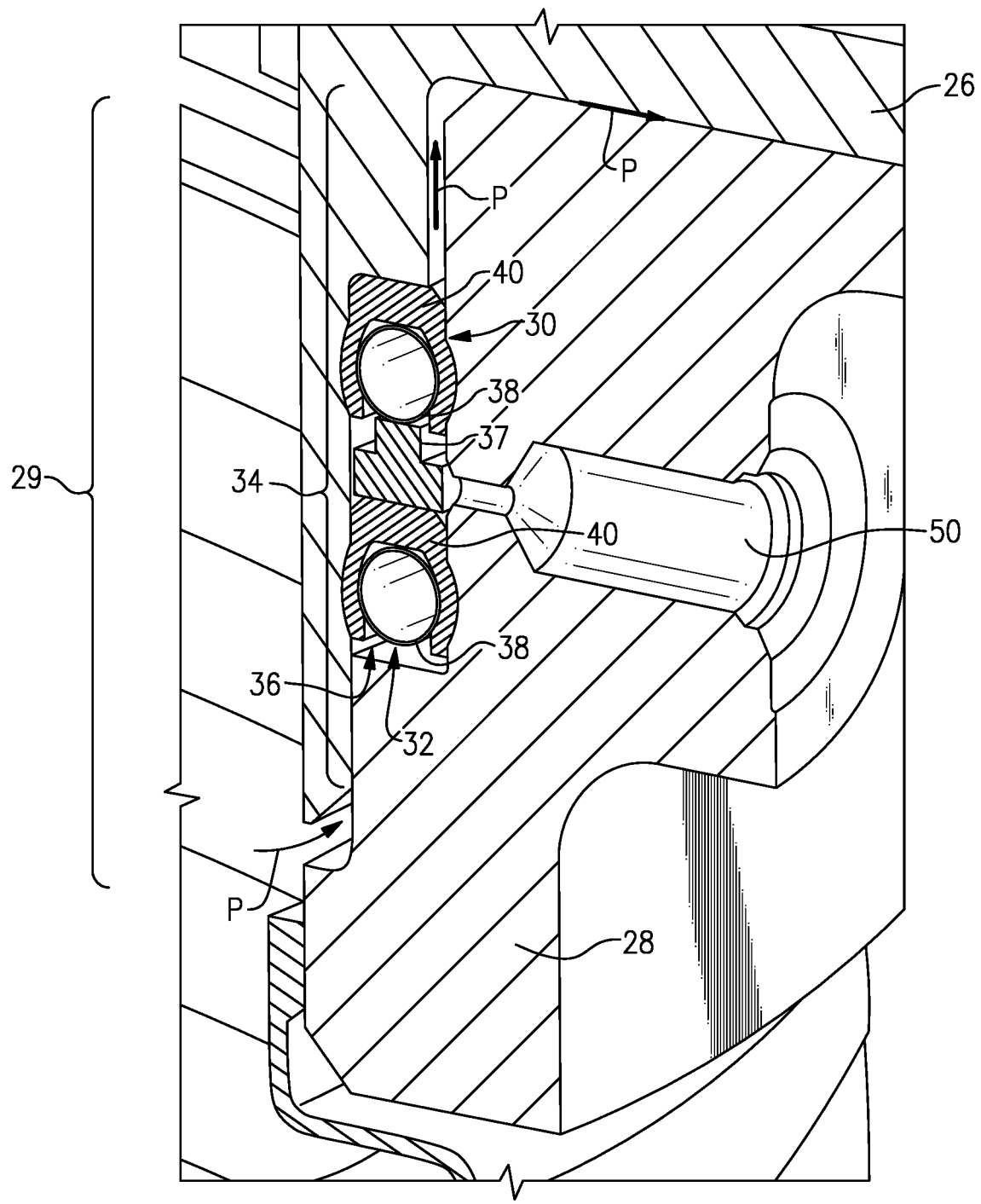
FIG. 2 illustrates a sectioned view through the torsional rings of the duct of FIG. 1.

Referring to FIG. 2 depicting the seal system 29 of duct 20, the seal system 29 includes the first and second torsional rings 26/28 and first and second seals 30/32. In this example, the first and second torsional rings 26/28 mate together and define an axial interface there between, generally designated at 34. The torsional rings 26/28 define a seal cavity 36 in the axial interface 34. The seals 20/32 are sandwiched between the torsional rings 26/28, in the seal cavity 36. The term "sandwiched" refers to the seals 30/32 compressed by the torsional rings 26/28 such that the seals 30/32 form a good seal against the sides of the seal cavity 36. The first and second seals 30/32 are axially spaced apart within the seal cavity 36. For example, a spacer ring 37 is disposed axially between the first and second seals 30/32 and facilitates keeping the seals 30/32 in an axially-spaced position. The spacer ring 37 separates the first and second seals 30/32 but does not itself provide any sealing. As an example the spacer ring is formed of fluoropolymer.

Propellant or other gases in the interior of the duct 20 may escape along a potential leak path (P) between the torsional rings 26/28. The axial interface 34 forms at least a portion of the potential leak path (P). The first and second dynamic seals 30/32 are disposed in the axial interface 34 and provide dynamic sealing between the first and second torsional rings 26/28 to limit escape of fluid to the exterior of the duct 20. The term "dynamic" used herein may refer to the ability of the seals 30/32 to maintain sealing as the torsion rings 26/28 move relative to one another. In this example, because the interior of the duct 20 will generally be at higher pressures than the exterior of the duct 20, the potential leak path through the torsional rings 26/28 will be from the interior to the exterior. Thus, the second seal 32 serves as a primary seal, i.e., the initial seal against leakage through the potential leak path, and the first ring seal 30 serves as a backup seal. Of course, in other implementations, the roles of the seals 30/32 may be reversed.

Figure 3:
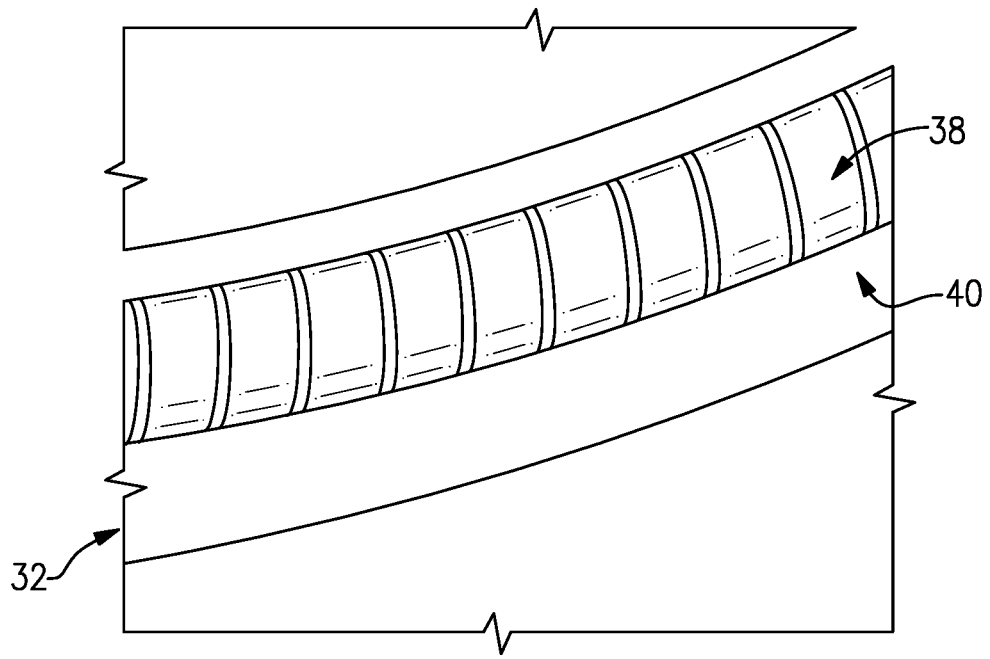
FIG. 3 illustrates an isolated view of a representative portion of a dynamic seal.

FIG. 3 illustrates a perspective view of the second seal 32. The seals 30/32 are identical. Thus, the second seal 32 shown in FIG. 3 is representative also of the first seal 30 shown in FIG. 2. The seal 32 includes an inner seal member 38 and an outer polymer jacket 40. In this example, the inner seal member 38 is a coil. Accordingly, between the seals 30/32, there are two (first and second) coils. Each coil can bend, extend, and compress with twisting forces or other forces applied via the torsional rings 26/28. The ability of the coil to bend, extend, and compress enables the seal 32 to dynamically seal. For example, the coil is a wound sheet or rod of metal, such as but not limited to, steel, stainless steel, or superalloys.

The outer polymer jacket 40 protects the coil from wear in the pocket 36. As an example, the polymer of the outer polymer jacket 40 is a low-friction polymer. Fluoropolymer is one example low-friction polymer. In one additional example, the outer polymer jacket 40 is formed of polytetrafluoroethylene.

Figure 4:
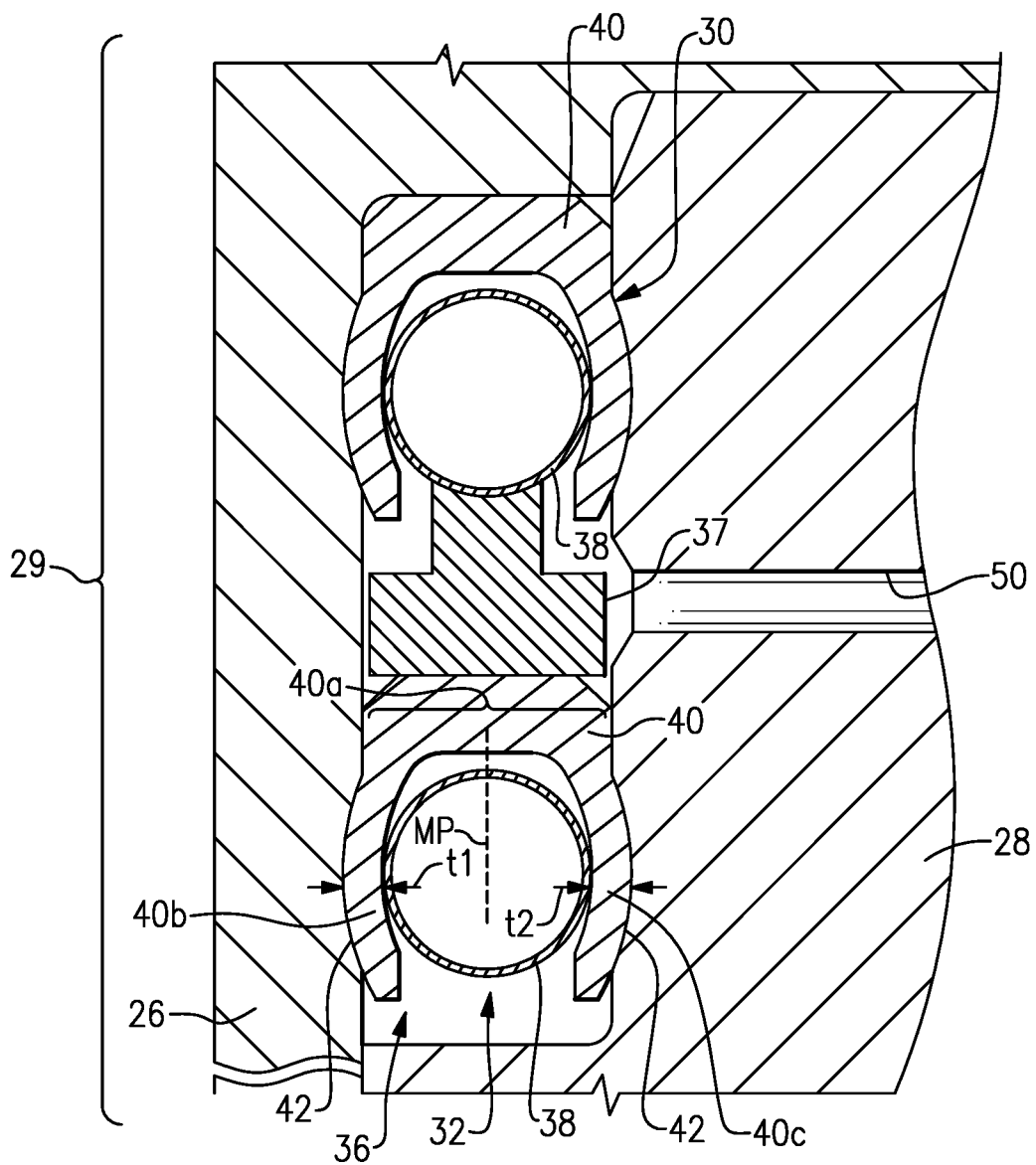
FIG. 4 illustrates a sectioned, axial view through the torsional rings and dynamic seals of the duct of FIG. 1.

Referring also to FIG. 4, which shows an axial view of the seals 30/32. The outer polymer jacket 40 includes a base 40a and first and second spaced-apart arms 40b/40c that project outwardly from the same side of the base 40a. The seal internal spring 38 is disposed between the arms 40b/40c but do not completely wrap around the seal internal spring 38. The arms 40b/40c retain the seal internal spring 38. In one further example, relative to a midplane MP of the cross-section of the ring seals 30/32, the first and second arms 40b/40c are non-symmetric. For instance, the second arm 40c, or a portion thereof, may be smaller or laterally thinner than the corresponding location on the first arm 40b. In FIG. 4, the thicknesses of the arms 40b/40c are depicted at t1 and t2, respectively. In this example, t2 is less than t1. The reduced thickness or mass on the second arm 40c lessens the force due to thermal shrinkage. At low or cryogenic temperatures, the polymer of the outer polymer jacket 40 thermally shrinks, thereby potentially decreasing the ability of a compressed seal to seal. However, by reducing the second arm 40c, such thermal shrinkage can be counteracted by the internal spring 38, the seals 30/32 may maintain sufficient sealing at low or cryogenic temperatures.

In one additional example, to further facilitate sealing, one or both of the arms 40b/40c have a controlled surface roughness. For example, the outer surface or surfaces 42 of the arm or arms 40b/40c that are in contact with the sides of the pocket 36 are polished or otherwise formed with a controlled surface roughness of equal to or less than 32 $R_a$, such as 25 Ra, 20 Ra, or 10 Ra or less. Surface roughness may be determined by ASME B46.1, in which Ra is the arithmetic average of the absolute values of the profile height deviations from the mean line, recorded within the evaluation length. A smooth surface 42 on the seals 30/32 is better able to seal against the sides of the seal cavity 36, i.e. the first and second torsional rings 26/28.

Figure 5:
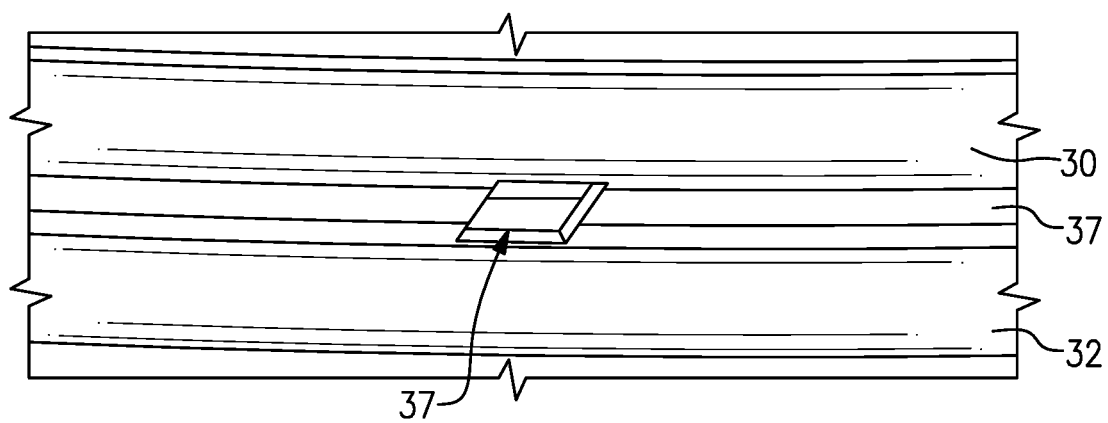
FIG. 5 illustrates a perspective view of two dynamic seals separated by a spacer ring.

FIG. 5 shows a view of the radially outer sides of the ring seals 30/32. The seals 30/32 are, in essence, stacked, with the spacer ring 37 there between. The spacer ring 37 includes a split 37a. Thus, the spacer ring 44 is a split ring, while the first and second dynamic seals 30/32 are endless rings that do not have any splits. The portions shown of the seals 30/32 are representative of all positions around the seals 30/32 (i.e., endless).

Optionally, as shown in FIGS. 2 and 4, one or the other of the first or second torsional rings 26/28 may include a port 50. In this example, the port 50 extends through the second torsional ring 28. The port 50 opens to the exterior of the first and second torsional rings 26/28 on one end and opens to the region between the first and second seals 30/32 on the other end. In this case, the port 50 opens in the vicinity of the spacer ring 37. Since the spacer ring 37 does not provide any sealing, if there is any leakage past the primary seal 32, such leakage will be communicated through the port 50. The port 50 can thus serve as an access point in a test phase to measure or detect leakage through the leak path (P). Otherwise, the port 50 may be plugged.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A duct comprising:
   first and second bellows sections;
   first and second torsional rings attached to, respectively, the first and second bellows sections; and
   first and second dynamic seals sandwiched between the first and second torsional rings,
   the first and second dynamic seals including, respectively, first and second coils,
      wherein the first and second dynamic seals includes an outer polymer jacket with base and first and second spaced apart non-symmetrical arms extending from the base.

2. The duct as recited in claim 1, wherein the first and second torsional rings define a seal cavity there between, and the first and second dynamic seals are disposed in the seal cavity.

3. The duct as recited in claim 1, wherein each of the first and second coils is an internal spring, and the first and second spaced apart non-symmetrical arms of each of the first and second dynamic seals partially surrounds, respectively, the first and second coils.

4. The duct as recited in claim 3, wherein the outer polymer jacket is formed of fluoropolymer.

5. The duct as recited in claim 3, wherein the internal spring is disposed between the first and second spaced apart non-symmetrical arms of the outer polymer jacket.

6. The duct as recited in claim 5, wherein surfaces of the first and second spaced-apart arms have a surface roughness that is equal to or less than 32 $R_a$.

7. The duct as recited in claim 1, further comprising a spacer ring disposed between the first and second dynamic seals.

8. The duct as recited in claim 7, wherein the spacer ring is a split ring.

9. The duct as recited in claim 7, wherein the spacer ring is formed of fluoropolymer.

10. The duct as recited in claim 1, wherein the first and second dynamic seals are continuous rings.

11. The duct as recited in claim 1, wherein at least one of the first or second torsional rings includes a port that opens to a region between the first and second dynamic seals.

12. A seal system comprising:
    first and second rings that are subject to relative twisting movement there between, the first and second rings defining an axial interface with each other, the axial interface providing at least a portion of a potential leak path between the first and second rings; and
    first and second dynamic seals disposed in the axial interface between the first and second rings,
       wherein the first and second dynamic seals includes an outer polymer jacket with base and first and second spaced apart non-symmetrical arms extending from the base.

13. The seal system as recited in claim 12, wherein the first and second dynamic seals are axially spaced apart.

14. The seal system as recited in claim 13, further comprising a spacer ring disposed axially between the first and second dynamic seals.

15. The seal system as recited in claim 12, wherein each of the first and second dynamic seals includes a coil.

16. The seal system as recited in claim 15, wherein the coil is disposed between the first and second spaced apart non-symmetrical arms of the outer polymer jacket.

17. The duct as recited in claim 7, wherein the spacer ring contacts each of the first and second dynamic seals.

18. The duct as recited in claim 1, wherein the first and second bellows sections define an axis, and first and second dynamic seals are entrapped axially between the first torsional ring and the second torsional ring.

19. The seal system as recited in claim 12, wherein the first and second dynamic seals are disposed about an axis, the first seal ring includes a first ledge, the second ring includes a second ledge, and the first and second dynamic seals are entrapped axially between the first ledge and the second ledge.

* * * * *